United States Patent
Salter et al.

(10) Patent No.: US 9,815,402 B1
(45) Date of Patent: Nov. 14, 2017

(54) TAILGATE AND CARGO BOX ILLUMINATION

(71) Applicant: Ford Global Technologies, LLC, Dearborn, MI (US)

(72) Inventors: Stuart C. Salter, White Lake, MI (US); James J. Surman, Clinton Township, MI (US); Paul Kenneth Dellock, Northville, MI (US); Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/406,935

(22) Filed: Jan. 16, 2017

(51) Int. Cl.
| | |
|---|---|
| *B60Q 1/00* | (2006.01) |
| *B60Q 3/00* | (2017.01) |
| *B60Q 3/30* | (2017.01) |
| *B60Q 1/24* | (2006.01) |
| *B62D 33/03* | (2006.01) |
| *B60R 3/00* | (2006.01) |
| *F21V 8/00* | (2006.01) |
| *F21V 5/04* | (2006.01) |
| *F21V 9/16* | (2006.01) |
| *F21K 9/64* | (2016.01) |
| *F21V 29/70* | (2015.01) |
| *F21V 7/22* | (2006.01) |
| *F21V 13/14* | (2006.01) |

(Continued)

(52) U.S. Cl.
CPC .......... *B60Q 3/30* (2017.02); *B60Q 1/24* (2013.01); *B60R 3/00* (2013.01); *B62D 33/03* (2013.01); *F21K 9/64* (2016.08); *F21V 5/04* (2013.01); *F21V 7/22* (2013.01); *F21V 9/16* (2013.01); *F21V 13/14* (2013.01); *F21V 23/003* (2013.01); *F21V 29/70* (2015.01); *G02B 6/0096* (2013.01); *F21Y 2113/10* (2016.08)

(58) Field of Classification Search
CPC . B60Q 1/22; B60Q 1/24; B60Q 1/245; B60Q 1/26; B60Q 1/2619; B60Q 3/30; B60Q 3/50; B60Q 3/60; B60Q 3/66; B60Q 3/68; B60R 3/00; B60R 19/48; B62D 33/0273; B62D 33/03; F21K 9/64; F21V 7/22; F21V 13/14; F21V 23/003; F21V 29/70; G02B 6/0096
USPC ................ 362/485, 496, 509–512, 520–523, 362/540–545
See application file for complete search history.

(56) References Cited

U.S. PATENT DOCUMENTS

| | | |
|---|---|---|
| 2,486,859 A | 11/1949 | Meijer et al. |
| 4,743,058 A * | 5/1988 | Fedrigo .............. B62D 33/0273 296/180.1 |
| 5,053,930 A | 10/1991 | Benavides |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Jason Moon Han
(74) *Attorney, Agent, or Firm* — Jason Rogers; Price Heneveld LLP

(57) ABSTRACT

A vehicle includes a cargo box including at least one side wall. A tailgate is coupled to the box and operable between open and closed positions. A light assembly is positioned in a vehicle rear portion of the at least one side wall. A box light is configured to emit light into the box and a puddle lamp is configured to emit light in a vehicle rearward direction.

18 Claims, 8 Drawing Sheets

(51) Int. Cl.
*F21V 23/00* (2015.01)
*F21Y 113/10* (2016.01)

(56) References Cited

U.S. PATENT DOCUMENTS

| | | | |
|---|---|---|---|
| 5,709,453 A | 1/1998 | Krent et al. |
| 5,839,718 A | 11/1998 | Hase et al. |
| 6,031,511 A | 2/2000 | DeLuca et al. |
| 6,117,362 A | 9/2000 | Yen et al. |
| 6,238,068 B1 | 5/2001 | Farmer |
| 6,260,990 B1 | 7/2001 | Saunders |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,786,623 B2 | 9/2004 | Snyder et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,834,750 B1 | 11/2010 | Hertz et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,120,236 B2 | 2/2012 | Auday et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthan et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0167668 A1 | 9/2003 | Kuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0056014 A1 | 2/2014 | Heaman et al. |
| 2014/0065442 A1 | 3/2014 | Kingsley et al. |
| 2014/0103258 A1 | 4/2014 | Agrawal et al. |
| 2014/0198510 A1 | 7/2014 | Kam et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2016/0016506 A1 | 1/2016 | Collins et al. |
| 2016/0102819 A1 | 4/2016 | Misawa et al. |
| 2016/0236613 A1 | 8/2016 | Trier |
| 2017/0158125 A1 | 6/2017 | Schuett et al. |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

* cited by examiner

TAILGATE AND CARGO BOX ILLUMINATION

FIELD OF THE DISCLOSURE

The present disclosure generally relates to tailgates and cargo boxes, and more particularly to illuminated tailgates and cargo boxes.

BACKGROUND OF THE DISCLOSURE

Tailgates allow access to the cargo boxes of vehicles for storage of items. Accordingly, illumination of cargo boxes and tailgates may be advantageous.

SUMMARY OF THE DISCLOSURE

According to one aspect of the present disclosure, a vehicle includes a cargo box including at least one side wall. A tailgate is coupled to the box and operable between open and closed positions. A light assembly is positioned in a vehicle rear portion of the at least one side wall. A box light is configured to emit light into the box and a puddle lamp is configured to emit light in a vehicle rearward direction.

According to another aspect of the present disclosure, a vehicle includes a cargo box including at least one side wall. A tailgate is coupled to the box and operable between open and closed positions. The tailgate including a light tube and a puddle lamp is configured to emit light in a rearward direction through the light tube when the tailgate is in the closed position.

According to yet another aspect of the present disclosure, a vehicle includes a cargo box including at least one side wall. A tail gate is coupled to the box and operable between open and closed positions. A puddle lamp is configured to emit light in a vehicle rearward direction when the tailgate is in the closed position, wherein the light is transmitted through the tailgate.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION OF THE PREFERRED EMBODIMENTS

Additional features and advantages of the invention will be set forth in the detailed description which follows and will be apparent to those skilled in the art from the description or recognized by practicing the invention as described in the following description together with the claims and appended drawings.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Figure 1A:
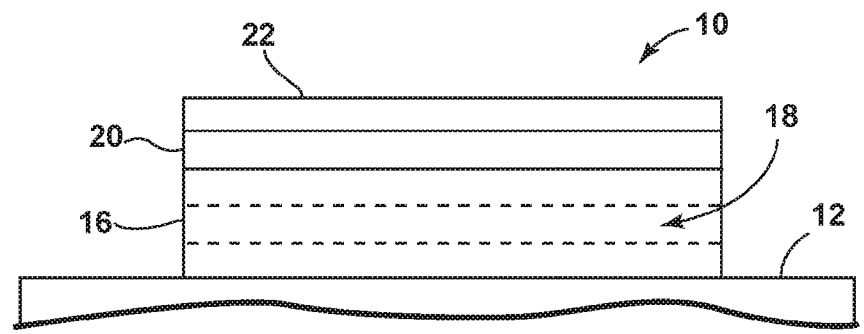
FIG. 1A is a side view of a photoluminescent structure rendered as a coating for use in a trim assembly according to one embodiment.
Figure 1B:
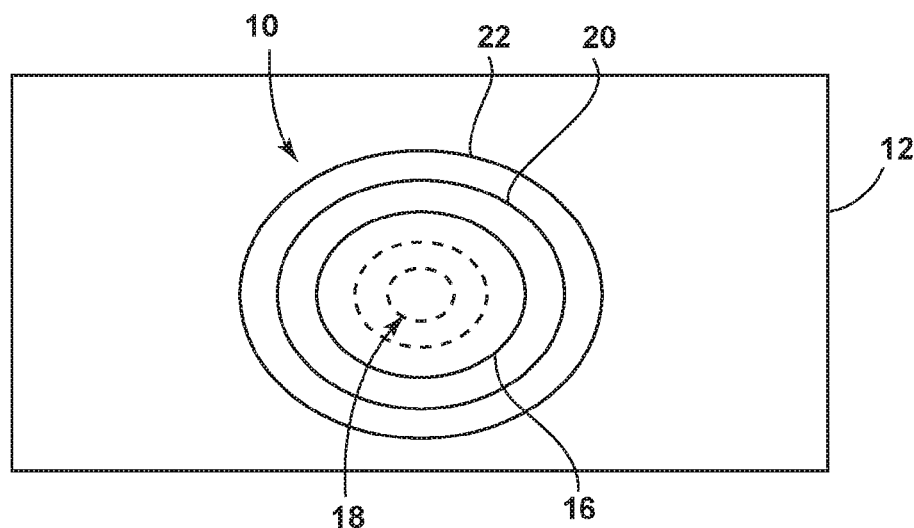
FIG. 1B is a top view of a photoluminescent structure rendered as a discrete particle according to one embodiment.
Figure 1C:
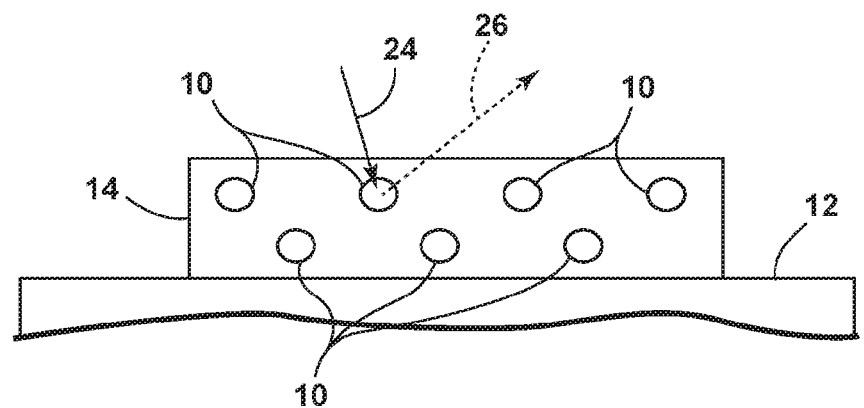
FIG. 1C is a side view of a plurality of photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle-related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sublayers, which are exemplarily shown through broken lines in FIGS. 1A and 1B. Each sublayer of the energy conversion layer 16 may include one or more photoluminescent materials 18 having energy converting elements with phosphorescent or fluorescent properties. Each photoluminescent material 18 may become excited upon receiving an excitation light 24 of a specific wavelength, thereby causing the light to undergo a conversion process. Under the principle of down conversion, the excitation light 24 is converted into a longer wavelength, converted light 26, that is outputted from the photoluminescent structure 10. Conversely, under the principle of up conversion, the excitation light 24 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

Light emitted by the sun, ambient sources and/or a light source 104 (FIG. 3) is referred to herein as excitation light 24 and is illustrated herein as solid arrows. In contrast, light emitted from the photoluminescent structure 10 is referred to herein as converted light 26 and is illustrated herein as broken arrows. The mixture of excitation light 24 and converted light 26 that may be emitted simultaneously is referred to herein as outputted light.

The energy conversion layer 16 may be prepared by dispersing the photoluminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to the substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the photoluminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into the substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some examples, the converted light 26 that has been down converted or up converted may be used to excite other photoluminescent material(s) 18 found in the energy conversion layer 16. The process of using the converted light 26 outputted from one photoluminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principal driving mechanism for an energy conversion process corresponding to a change in wavelength of light. In the various embodiments discussed herein, each of the photoluminescent structures 10 may operate under either conversion principle.

Referring back to FIGS. 1A and 1B, the photoluminescent structure 10 may optionally include at least one stability layer 20 to protect the photoluminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protective layer 22 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM"; U.S. Pat. No. 8,247,761 to Agrawal et al., entitled "PHOTOLUMINESCENT MARKINGS WITH FUNCTIONAL OVERLAYERS"; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION"; U.S. Pat. No. 8,664,624 B2 to Kingsley et al., entitled "ILLUMINATION DELIVERY SYSTEM FOR GENERATING SUSTAINED SECONDARY EMISSION"; U.S. Patent Publication No. 2012/0183677 to Agrawal et al., entitled "PHOTOLUMINESCENT COMPOSITIONS, METHODS OF MANUFACTURE AND NOVEL USES"; U.S. Pat. No. 9,057,021 to Kingsley et al., entitled "PHOTOLUMINESCENT OBJECTS"; and U.S. Pat. No. 8,846,184 to Agrawal et al., entitled "CHROMIC LUMINESCENT OBJECTS," all of which are incorporated herein by reference in their entirety.

According to one embodiment, the photoluminescent material 18 may include organic or inorganic fluorescent dyes including rylenes, xanthenes, porphyrins, and phthalocyanines. Additionally, or alternatively, the photoluminescent material 18 may include phosphors from the group of Ce-doped garnets such as YAG:Ce and may be a short persistence photoluminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the photoluminescent structure 10 drops below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some embodiments, the rare earth aluminum garnet type Ce phosphor may serve as the photoluminescent material 18 with ultra-short persistence characteristics, which can emit the converted light 26 by absorbing purple to blue excitation light 24 emitted from a light source and/or ambient sources. According to one embodiment, a ZnS:Ag phosphor may be used to create a blue converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short persistence photoluminescent material known in the art may be utilized without departing from the teachings provided herein. Additional information regarding the production of short persistence photoluminescent materials is disclosed in U.S. Pat. No. 8,163,201 to Kingsley et al., entitled "PHOTOLYTICALLY AND ENVIRONMENTALLY STABLE MULTI-LAYER STRUCTURE FOR HIGH EFFICIENCY ELECTROMAGNETIC ENERGY CONVERSION AND SUSTAINED SECONDARY EMISSION," the entire disclosure of which is incorporated herein by reference.

Additionally, or alternatively, the photoluminescent material 18, according to one embodiment, disposed within the photoluminescent structure 10 may include a long persistence photoluminescent material 18 that emits the converted light 26, once charged by the excitation light 24. The excitation light 24 may be emitted from any excitation source (e.g., any natural light source, such as the sun, and/or any artificial light source). The long persistence photoluminescent material 18 may be defined as having a long decay time due to its ability to store the excitation light 24 and release the converted light 26 gradually, for a period of several minutes or hours, once the excitation light 24 is no longer present.

The long persistence photoluminescent material 18, according to one embodiment, may be operable to emit light at or above an intensity of 0.32 mcd/m$^2$ after a period of 10 minutes. Additionally, the long persistence photoluminescent material 18 may be operable to emit light above or at an intensity of 0.32 mcd/m$^2$ after a period of 30 minutes and, in some embodiments, for a period substantially longer than 60 minutes (e.g., the period may extend 24 hours or longer, and in some instances, the period may extend 48 hours). Accordingly, the long persistence photoluminescent material 18 may continually illuminate in response to excitation from any light sources that emits the excitation light 24, including, but not limited to, natural light sources (e.g., the sun) and/or any artificial light source. The periodic absorption of the excitation light 24 from any excitation source may provide for a substantially sustained charge of the long persistence photoluminescent material 18 to provide for consistent passive illumination. In some embodiments, a light sensor may monitor the illumination intensity of the photoluminescent structure 10 and actuate an excitation source when the illumination intensity falls below 0.32 mcd/m$^2$, or any other predefined intensity level.

The long persistence photoluminescent material 18 may correspond to alkaline earth aluminates and silicates, for example doped di-silicates, or any other compound that is capable of emitting light for a period of time once the excitation light 24 is no longer present. The long persistence photoluminescent material 18 may be doped with one or more ions, which may correspond to rare earth elements, for example, $Eu^{2+}$, $Tb^{3+}$ and/or $Dy^3$. According to one non-limiting exemplary embodiment, the photoluminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 10, according to one embodiment, may be a translucent white color, and in some instances reflective, when unilluminated. Once the photoluminescent structure 10 receives the excitation light 24 of a particular wavelength, the photoluminescent structure 10 may emit any color light (e.g., blue or red) therefrom at any desired brightness. According to one embodiment, a blue-emitting phosphorescent material may have the structure $Li_2ZnGeO_4$ and may be prepared by a high temperature solid-state reaction method or through any other practicable method and/or process. The afterglow may last for a duration of 2-8 hours and may originate from the excitation light 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in toluene/isopropanol, 125 parts of a blue green long persistence phosphor, such as Performance Indicator PI-BG20, and 12.5 parts of a dye solution containing 0.1% Lumogen Yellow F083 in dioxolane may be blended to yield a low rare earth mineral photoluminescent structure 10. It will be understood that the compositions provided herein are non-limiting examples. Thus, any phosphor known in the art may be utilized within the photoluminescent structure 10 without departing from the teachings provided herein. Moreover, it is contemplated that any long persistence phosphor known in the art may also be utilized without departing from the teachings provided herein.

Additional information regarding the production of long persistence photoluminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," the entire disclosure of which is incorporated herein by reference. For additional information regarding long persistence phosphorescent structures, refer to U.S. Pat. No. 6,953,536 to Yen et al., entitled "LONG PERSISTENT PHOSPHORS AND PERSISTENT ENERGY TRANSFER TECHNIQUE"; U.S. Pat. No. 6,117,362 to Yen et al., entitled "LONG-PERSISTENT BLUE PHOSPHORS"; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," all of which are incorporated herein by reference in their entirety.

Referring now to FIGS. 2-5C, depicted is a vehicle 30 including a cargo box 34 having at least one side wall 38. A tailgate 42 is coupled to the cargo box 34 and is operable between open and closed positions. A light assembly 46 is positioned in a vehicle rear portion of the at least one side wall 38. Light assembly 46 includes a box light 50 which is configured to emit light into the cargo box 34. A puddle lamp 54 is configured to emit light in a vehicle rearward direction.

Figure 2:
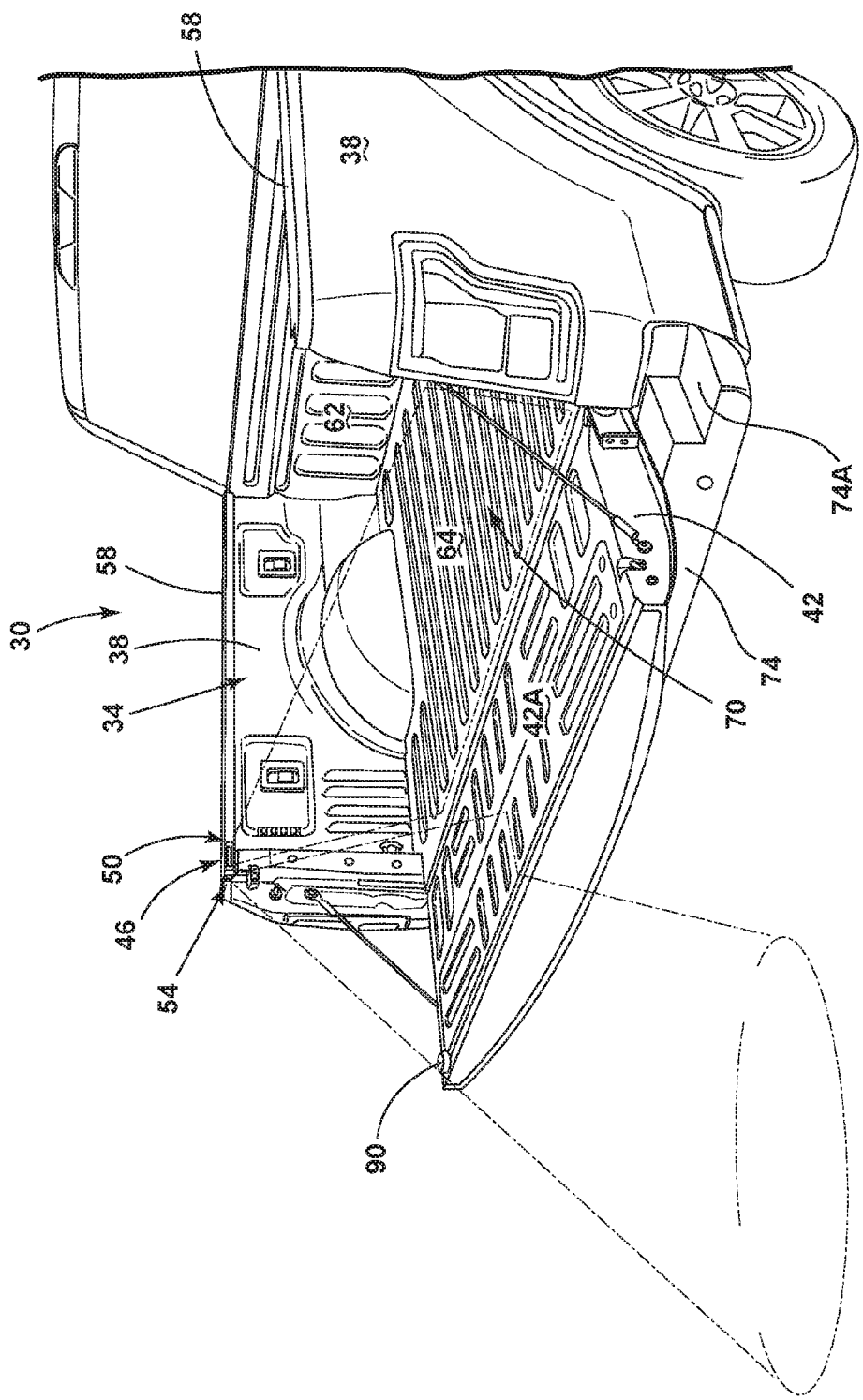
FIG. 2 is a rear perspective view of a pickup truck, according to one example.

Referring now to FIG. 2, the vehicle 30 is depicted as a pickup truck, but it will be understood that the present disclosure may be equally applied to vehicles having cargo spaces such as vans, trailers and the like. The tailgate 42 is shown as defining a rear wall of the cargo box 34. Positioned on both sides of the tailgate 42 are the side walls 38. The side walls 38 each define a top surface 58, each of which may extend the length of the cargo box 34. A front wall 62 may correspond to a cab of the vehicle 30, or may be a separate wall. Positioned at a base of the cargo box 34 may be a cargo surface 64. Together, the tailgate 42, the side walls 38, the cargo surface 64 and the front wall 62 cooperate to define a cargo space 70 within the cargo box 34. The cargo space 70 and cargo surface 64 are configured to hold a variety of objects. As the tailgate 42 is operable between open and closed positions, access to the cargo space 70 may be increased or decreased depending on the position of the tailgate 42. A bumper 74 is positioned in a vehicle rearward and the cargo box 34 and below the tailgate 42. The bumper 74 to define one or more bumper steps 74A which may be utilized by an occupant or user of the vehicle to step up onto the bumper 74.

Figure 3A:
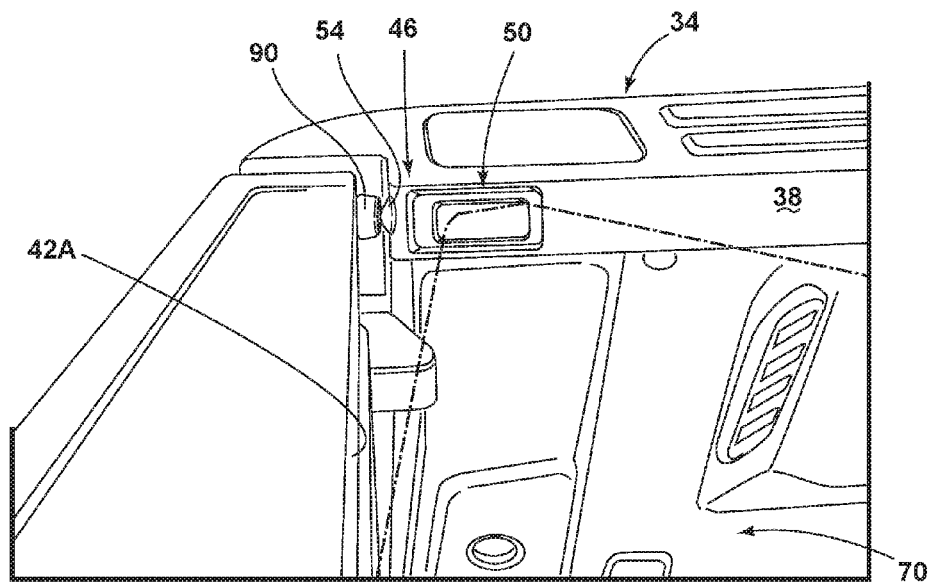
FIG. 3A is a top perspective view of a tailgate in a closed position, according to one example.
Figure 3B:
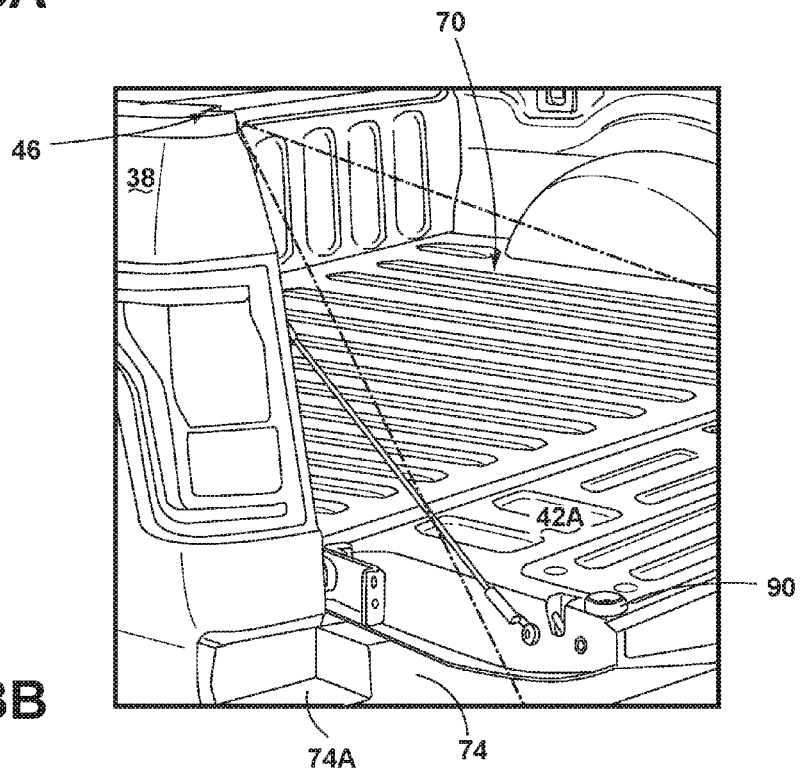
FIG. 3B is a rear perspective view of a tailgate in an open position, according to one example.
Figure 3C:
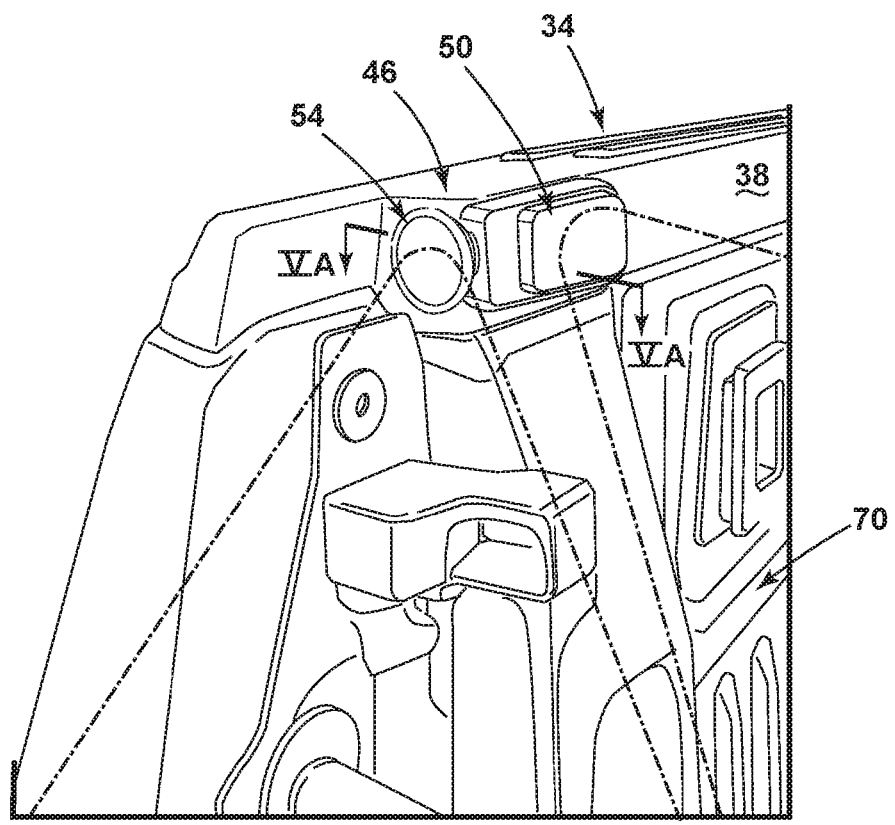
FIG. 3C is a perspective view of a tailgate in an open position, according to one example.

Referring now to FIGS. 2-3C, the light assembly 46 is positioned in a vehicle rearward portion of the side wall 38. Although the light assembly 46 is positioned in a single side wall 38 in the depicted example, it will be understood that the cargo box 34 may incorporate multiple light assemblies 46 positioned in a single or both side walls 38. For example, the cargo box 34 may include a second light assembly 46 positioned at a vehicle rearward location of a side wall 38 located on the passenger side of the vehicle 30. In the depicted example, the light assembly 46 includes both the puddle lamp 54 and the box light 50, but it will be understood that the light assembly 46 may include only the puddle lamp 54 or the box light 50. Both the puddle lamp 54 and the box light 50 may emit light while the tailgate 42 is in the open and/or closed positions.

The box light 50 is configured to emit light into the cargo space 70 of the cargo box 34. The light provided by the box light 50 the cover portion, a majority, or substantially all of the cargo space 70. The illumination provided by the box light 50 may be substantially uniform or may vary in intensity across the cargo space 70. For example, illumination provided by the box light 50 may have a greater intensity proximate attachment features (e.g., tie down cleats) located within the cargo box 34 relative to the cargo space 70. Further, the illumination provided by the box light 50 may be a single color or may vary across the cargo space 70. The box light 50 may be configured to emit light only into the cargo space 70. Additionally or alternatively, the box light 50 may provide illumination to the side walls 38 and/or an interior surface 42A of the tailgate 42 (e.g., in either the open or closed positions). The box light 50 may be configured to emit light between about 0° and about 180° relative to a major surface of the side wall 38.

Figure 4:
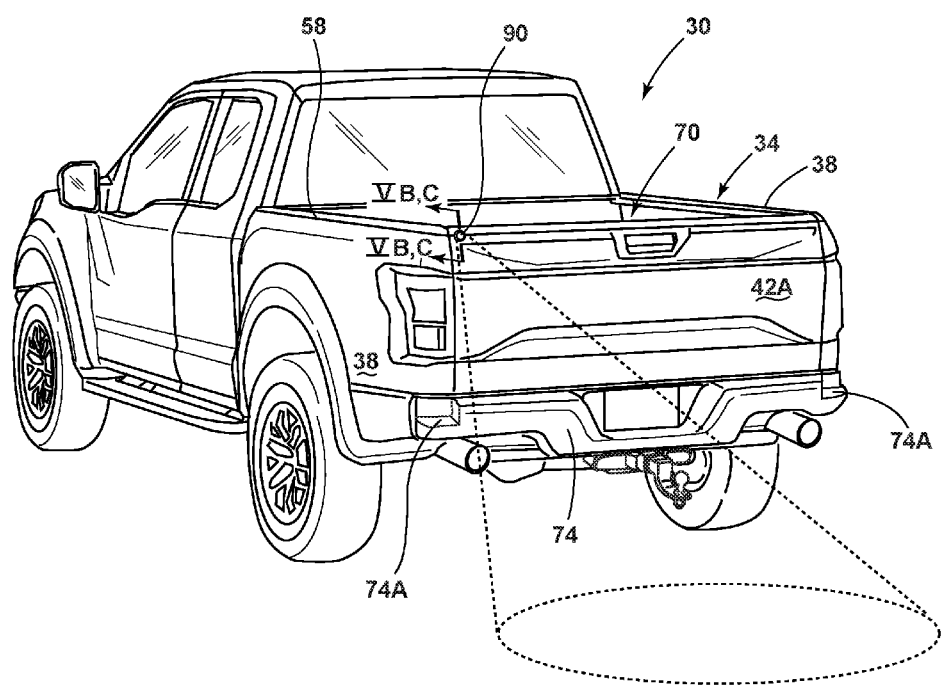
FIG. 4 is a rear perspective view of a tailgate in a closed position, according to one example.

Referring now to FIGS. 2-4, the puddle lamp 54 is configured to emit light in a vehicle rearward direction from the light assembly 46. The light emitted from the puddle lamp 54 may be directed onto the tailgate 42 and/or behind the vehicle 30 (e.g., onto the ground beneath the vehicle 30). The puddle lamp 54 may be configured to emit light when the tailgate 42 is in either the open or the closed positions. When the tailgate 42 is in the closed position, the puddle lamp 54 may emit light through the tailgate 42 to illuminate the bumper 74, the bumper steps 74A and the ground beneath the vehicle 30. Positioned on the interior surface 42A of the tailgate 42 is a grommet 90. The grommet 90 may be an annular structure composed of a rubber or polymeric material. When the tailgate 42 is in the closed position, the grommet 90 is configured to couple with the side wall 38 such that the light emitted by the puddle lamp 54 is channeled into the tailgate 42. A reflective film or coating may be disposed on an interior surface of the grommet 90 such that light contacting the grommet 90 may be reflected into the tailgate 42. Such an example may be advantageous in decreasing the light loss between the puddle lamp 54 and the tailgate 42.

Figure 5A:
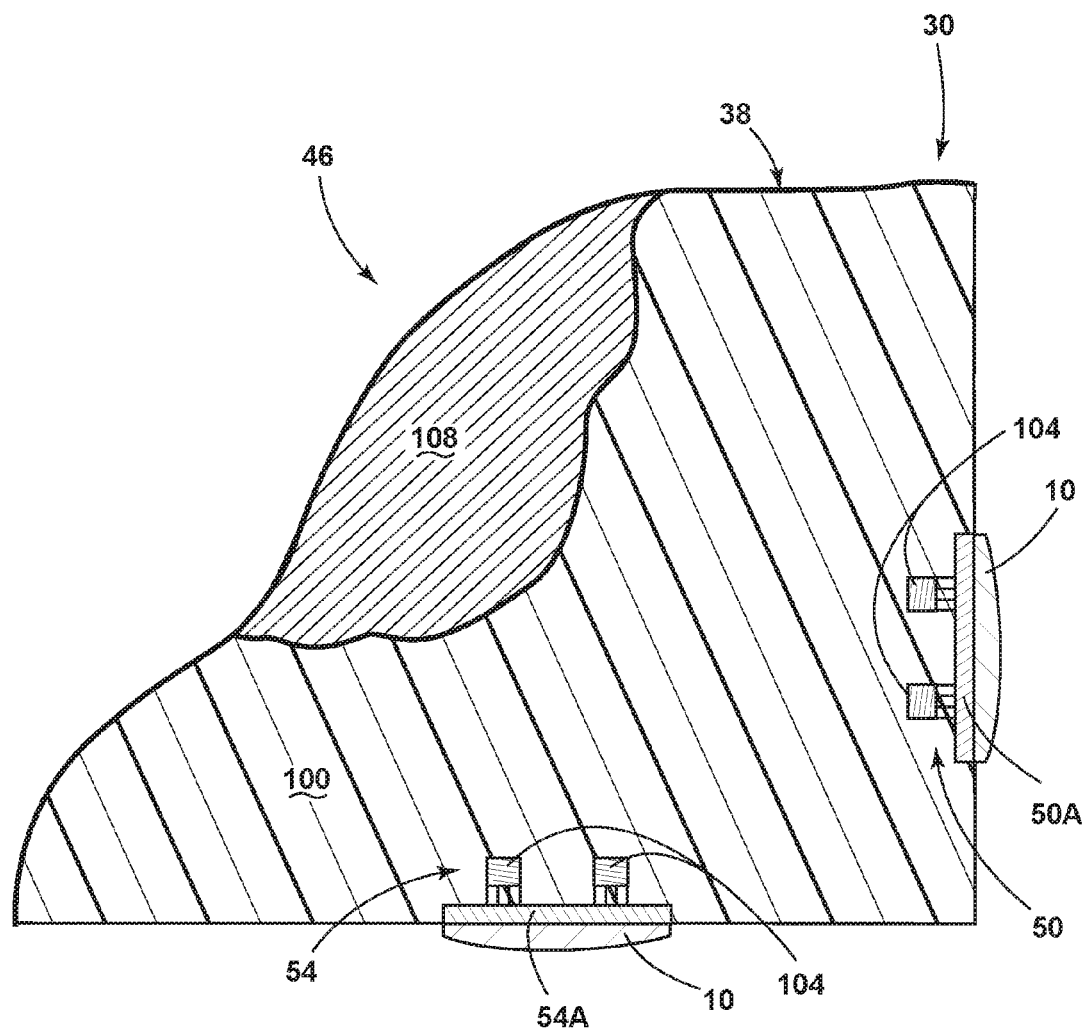
FIG. 5A is a cross-sectional view taken at line VA of FIG. 3C, according to one example.

Referring now to FIG. 5A, the light assembly 46 may be a single structure including both the box light 50 and the puddle lamp 54. In the depicted example, the box light 50 and puddle lamp 54 may include a single printed circuit board (PCB) 100 on which a plurality of light sources 104 are located (e.g., one grouping of light sources 104 for the box light 50 and one grouping for the puddle lamp 54). The light sources 104 of the puddle lamp 54 and/or the box light 50 may be configured to emit different colors. For example, the puddle lamp 54 may include both a white light source and a red light source. It will be understood that other colors, such as amber, may also be used. Use of a white light source for the puddle lamp 54 may advantageously be used to aid in the loading and unloading of cargo from the cargo space 70 (e.g., by illuminating a ground space behind the vehicle 30). Use of a red light source in the puddle lamp 54 may be advantageous when the vehicle 30 is operating (e.g., as running lights or as stoplights). Similarly to the puddle lamp 54, the box light 50 may also include differently colored light sources 104. As with the puddle lamp 54, white light may be used to aid in the loading of cargo into the cargo space 70 (e.g., position cargo within the cargo box 34), while use of red light may illuminate the cargo space 70 to provide a larger surface area to indicate braking. It will be understood that colored transparencies to filter light from the light sources 104 may be used without departing from the teachings provided herein.

A heat sink 108 may be positioned beneath PCB 100 to drain away heat produced by the light sources 104. The heat sink 108 may be positioned or portion, or all of, the PCB 100. Advantageously, a single heat sink 108 may be utilized for configurations of the light assembly 46 in which the puddle lamp 54 and the box light 50 may not be operated at the same time.

A box lens 50A and a puddle lens 54A are each positioned within apertures of the side wall 38 and proximate the light sources 104. The box and puddle lenses 50A, 54A may be composed of a transparent and/or translucent class or polymeric material. The box and puddle lenses 50A, 54A may be configured to snap into place within the apertures of the side walls 38. The cargo lens 54A may be shaped such that the light emitted from the light sources 104 may be spread across the cargo space 70 and provide even illumination to the entirety of the cargo box 34. The puddle lens 54A may be configured to spread light (e.g., when the tailgate 42 is in the open position) or may be configured to collimate light (e.g., when the tailgate 42 is in the closed position). The puddle lens 54A is sized and shaped such that coupling with the grommet 90 allow for the maximum amount of light to be transmitted into the tailgate 42.

The box and puddle lenses 50A, 54A each define an interior and exterior surface. The photoluminescent structure 10 may be positioned on the interior and/or exterior surface of the box and puddle lenses 50A, 54A. In such examples, the light sources 104 of the box light 50 and/or puddle lamp 54 may be configured to emit the excitation emission 26 (e.g., blue and/or ultraviolet light) such that the photoluminescent structure 10 luminesce is in response. As such, the photoluminescent structure 10 may be configured to emit light having a color of red, green, blue, white and/or combinations. Such an example may be advantageous in providing a smooth, even, illumination of the box light 50 and/or puddle lamp 54.

Figure 5B:
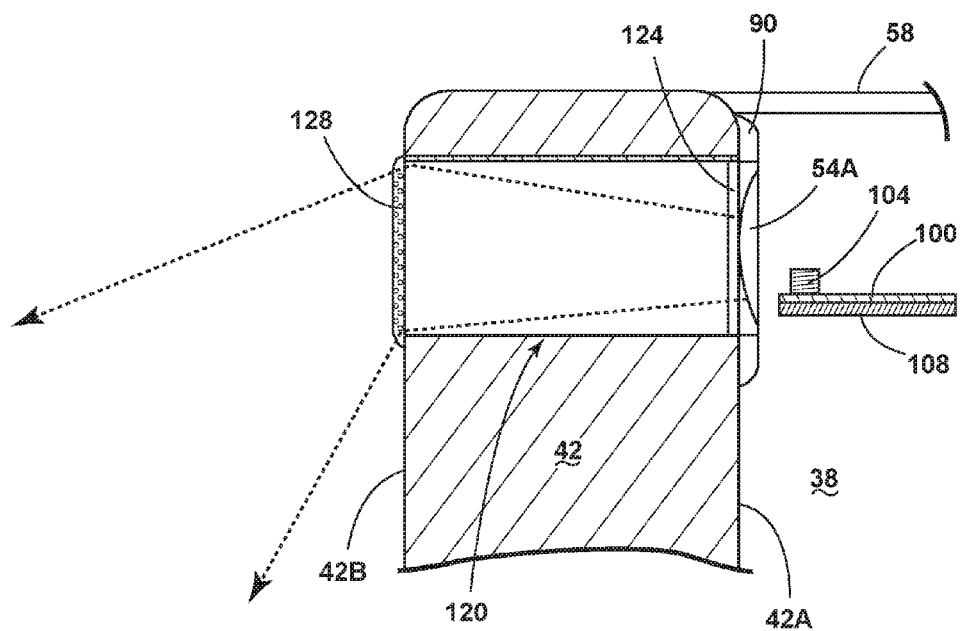
FIG. 5B is a cross-sectional view taken at line VB of FIG. 4, according to one example.
Figure 5C:
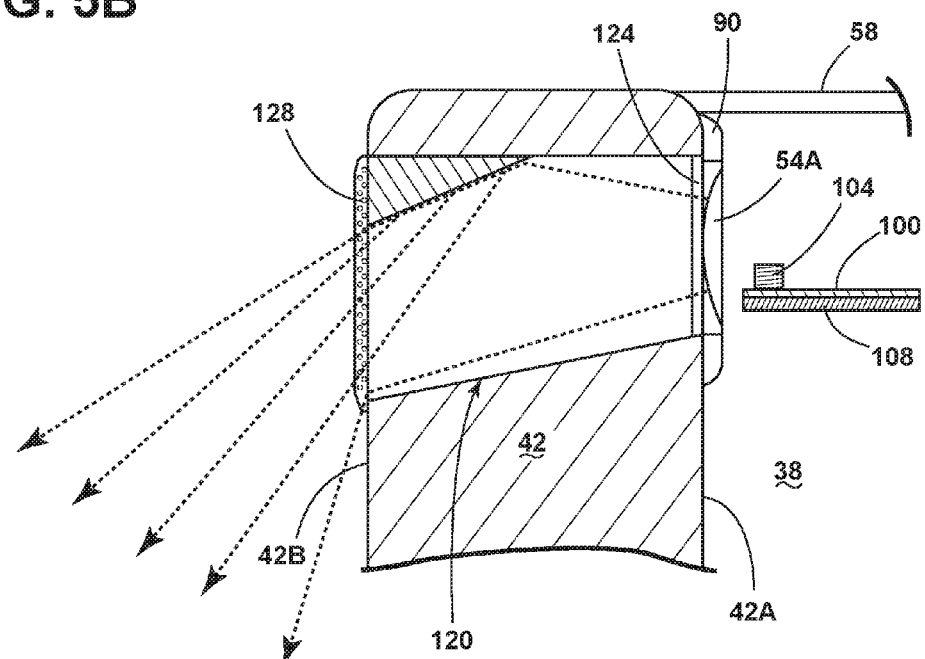
FIG. 5C is a cross-sectional view taken at line VC of FIG. 4, according to another example.

Referring now to FIGS. 5B and 5C, a light tube 120 is positioned within the tailgate 42. The light tube 120 extends from the interior surface 42A of the tailgate 42 to an exterior surface 42B of the tailgate 42. The light tube 120 may be a cavity defined by the tailgate 42 and/or may include a sleeve or other support structure disposed through the tailgate 42. In another example, the light tube 120 may be a solid structure such as a light guide or a fiber optic element. An interior surface (e.g., a surface light may contact) of the light tube 120 may include a reflective coating and/or film such that light is reflected down the light tube 120 thereby increasing transmission of light through the tailgate 42. The light tube 120 may have a circular, triangular, square or higher order polygon cross-sectional shape. The diameter, or longest cross-sectional dimension, may vary across the length of the light tube 120. The light tube 120 includes an interior cover 124 and an exterior cover 128. The interior cover 124 is positioned on the interior surface 42A of the tailgate 42. The exterior cover 128 is positioned on the exterior surface 42B of the tailgate 42. Together, the interior and exterior covers 124, 128 encapsulate the light tube 120 such that the light tube 120 is protected from environmental exposure. The grommet 90 is positioned around the interior cover 124 such that when the tailgate 42 is in the closed position, light from the puddle lamp 54 is channeled into the light tube 120.

The interior and exterior covers 124, 128 may be composed of a glass and/or polymeric material which is sufficiently transparent to light from the puddle lamp 54 to allow the light to enter and exit the light tube 120. As such, light from the puddle lamp 54 may pass, or be transmitted, through the tailgate 42. It will be understood that one or more of the interior and exterior covers 124, 128 may be colored or tinted to change the perceived color passing though the tailgate 42. According to various examples, one or more of the interior and exterior covers 124, 128 may include optics. For example, the interior cover 124 may include optics to adjust the path of light emitted from the puddle lens 54A such that the maximum transmission of the light through the light tube 120 is achieved. At least one of the interior and exterior covers 124, 128 may include pillow optics to redirect light in a downward manner. In the depicted example of FIG. 5B, the exterior cover 128 defines pillow optics configured to direct the light downward (e.g., toward the ground or bumper 74). In the depicted example of FIG. 5C, the light tube 120 includes a reflective element 140 configured to reflect the light from the puddle lamp 54 in a downward direction. The reflective element 140 is depicted toward a vehicle rearward end of the light tube 120, but it will be understood that the element 140 may be positioned anywhere within the tube 120. Further, the element 140 may be transflective such that a portion of the light from the puddle lamp 54 is allowed to travel straight back from the tailgate 42. Use of the pillow optics and/or the reflective element 140 may be advantageous in directing light downward toward the bumper step 74A and/or a ground beneath the vehicle 30.

Figure 6:
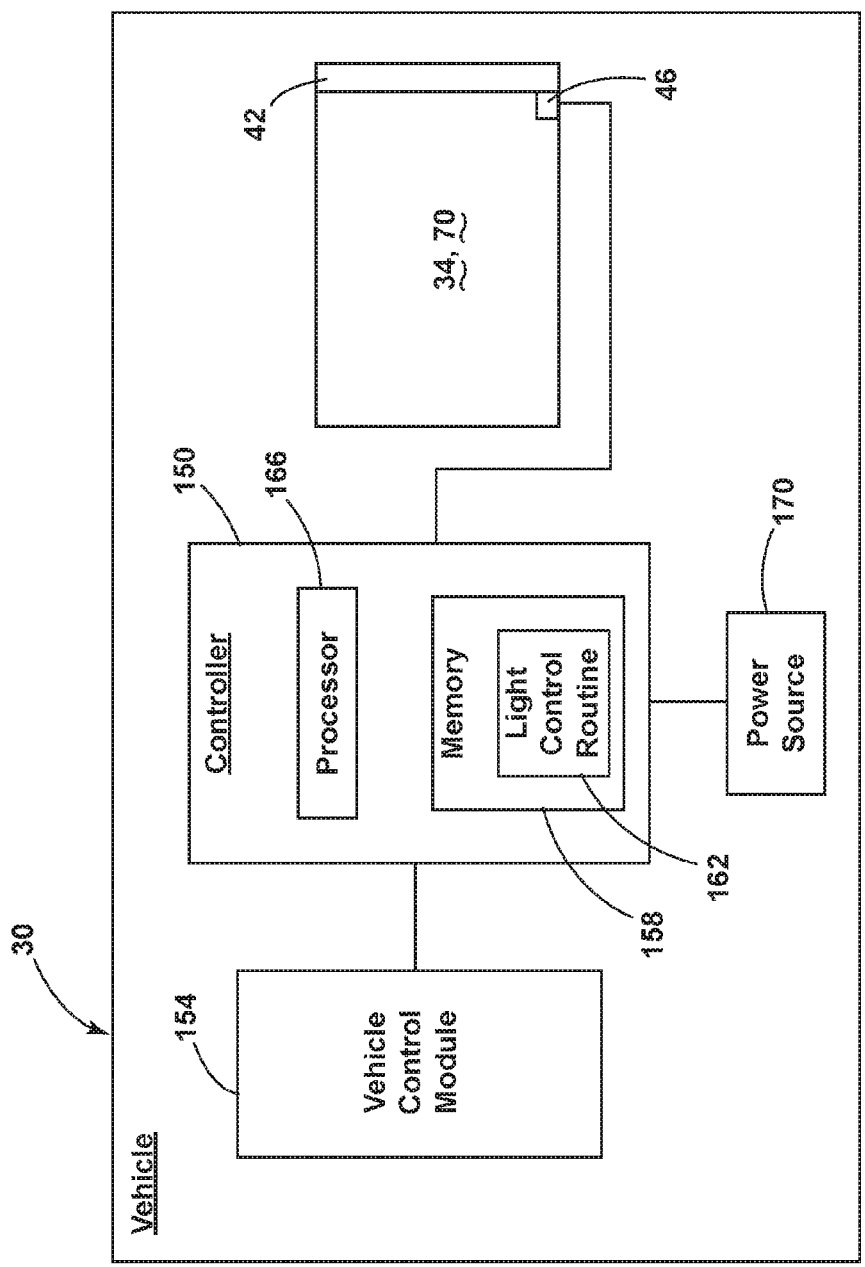
FIG. 6 is a block diagram of the vehicle.

Referring now to FIG. 6, depicted is a block diagram of the vehicle 30 in which the light assembly 46 is implemented. The vehicle 30 includes a controller 150 in communication with one or more vehicle control modules 154. The vehicle control module 154 may be configured to relay information to the controller 150 from a variety of sensors (e.g., braking, speed, proximity, cargo box weight, day/night, etc.) positioned around the vehicle 30. The controller 150 may include a memory 158 having a light control routine 162 contained therein that is executed by a processor 166 of the controller 150. The controller 150 may provide electrical power to the lighting assembly 46 via a power source 170 located onboard the vehicle 30. In addition, the controller 150 may be configured to control the light emitted from the lighting assembly 46 based on feedback received from the vehicle control module 154. The light control routine 162 may include a variety of routines configured to vary the intensity and/or color of the light emitted from the light assembly 46. For example, if motion is detected proximate a rear or side of the vehicle 30 exterior to the cargo space 70, the controller 150 may activate only the puddle lamp 54. In another example, if motion is detected within the cargo space 70, both the box light 50 and the puddle lamp 54 may be activated as users of the vehicle are likely loading or unloading cargo from the cargo space 70. In yet another example, if the tailgate 42 is detected in the closed position, and a transmission of the vehicle 30 is in a drive gear, the puddle lamp 54 may be activated as a running lamp and/or brake lights (e.g., red light emitted).

Use of the present disclosure may offer a variety of advantages. First, positioning the puddle lamp 54 within a vehicle rear portion of the side wall 38 proximate the top surface 58 allows for a high mounting position where minimal shadowing may occur as well as optimal light spread may be achieved for the cargo space 70. Further, the additional height may aid with evenly illuminating loading areas and ramps external to the vehicle 30. Second, high positioning of the puddle lamp 54 allows the puddle lamp 54 to function as both loading, braking and running lights for the vehicle 30. Third, use of the light pipe may allow the minimization of electronics and lighting within the tailgate 42 such that cost, complexity and assembly labor may be minimized.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims as set forth below, are incorporated into and constitute part of this Detailed Description.

What is claimed is:

1. A vehicle comprising:
   a cargo box including at least one side wall;
   a tailgate coupled to the box and operable between open and closed positions, wherein a light tube extends within the tailgate; and
   a light assembly positioned in a vehicle rear portion of the at least one side wall and configured to emit light into the light tube.

2. The vehicle of claim 1, wherein the light assembly is positioned proximate a top surface of the side wall.

3. The vehicle of claim 2, wherein the light tube comprises a reflective element configured to redirect light in a downward direction.

4. The vehicle of claim 2, wherein the light tube comprises a transparent cover.

5. The vehicle of claim 4, wherein the transparent cover comprises pillow optics.

6. A vehicle comprising:
   a cargo box including at least one side wall;
   a tailgate coupled to the box and operable between open and closed positions, the tailgate including a light tube; and
   a puddle lamp configured to emit light in a rearward direction through the light tube when the tailgate is in the closed position.

7. The vehicle of claim 6, wherein the puddle lamp is configured to emit multiple colors of light.

8. The vehicle of claim 6, wherein the puddle lamp is further configured to emit light when the tailgate is in the open position.

9. The vehicle of claim 6, wherein the puddle lamp is configured to emit light onto a bumper step.

10. The vehicle of claim 6, further comprising:
    a grommet positioned on the tailgate proximate the light pipe and configured to couple to the puddle lamp when the tailgate is in the closed position.

11. The vehicle of claim 6, wherein the puddle lamp is positioned proximate a top surface of the at least one side wall.

12. The vehicle of claim 6, wherein the puddle lamp comprises a light source and a lens.

13. The vehicle of claim 6, further comprising:
    a cargo lamp positioned proximate the puddle lamp and configured to emit light into the cargo box, wherein the cargo lamp comprises a photoluminescent structure.

14. A vehicle comprising:
    a cargo box including at least one side wall;
    a tail gate coupled to the box and operable between open and closed positions; and
    a puddle lamp configured to emit light in a vehicle rearward direction when the tailgate is in the closed position, wherein the light is transmitted through a light tube positioned through the tailgate.

15. The vehicle of claim 14, wherein the puddle lamp is further configured to emit light when the tailgate is in the open position.

16. The vehicle of claim 15, wherein the puddle lamp is positioned proximate a top surface of the at least one side wall.

17. The vehicle of claim 16, further comprising:
    a grommet positioned on the tailgate proximate the light pipe and configured to couple to the puddle lamp when the tailgate is in the closed position.

18. The vehicle of claim 17, wherein the light tube is configured to direct light from the puddle lamp in a downward direction.

* * * * *